United States Patent
Christenson et al.

(10) Patent No.: US 6,491,109 B2
(45) Date of Patent: Dec. 10, 2002

(54) KINETIC ANTIFREEZE DEVICE

(76) Inventors: Joel P. Christenson, 151 N. Cline Ave., Griffith, IN (US) 46319; Gary M. Engel, 401 Oneida, LaCrosse, IN (US) 46348

(*) Notice: Subject to any disclaimer, the term of this patent is extended or adjusted under 35 U.S.C. 154(b) by 0 days.

(21) Appl. No.: 09/853,941

(22) Filed: May 11, 2001

(65) Prior Publication Data

US 2002/0166583 A1 Nov. 14, 2002

(51) Int. Cl.$^7$ .................. F16K 17/16; A62C 35/62
(52) U.S. Cl. .................. 169/17; 169/16; 137/68.19; 137/68.23
(58) Field of Search .................. 137/68.19, 68.23; 138/27; 169/5, 16, 17; 220/87.2

(56) References Cited

U.S. PATENT DOCUMENTS

| | | | |
|---|---|---|---|
| 1,159,225 A | * 11/1915 | Howell | 138/27 |
| 2,716,506 A | 8/1955 | Fike | |
| 3,091,359 A | 5/1963 | Wood | |
| 3,268,009 A | * 8/1966 | Bussey et al. | 169/16 |
| 3,319,657 A | * 5/1967 | Nyiri | 138/27 |
| 3,526,336 A | 9/1970 | Wood | |
| 4,205,820 A | * 6/1980 | Bray | 251/94 |
| 4,207,913 A | 6/1980 | Fike, Jr. | |
| 4,236,648 A | 12/1980 | Wood et al. | |
| 4,326,589 A | * 4/1982 | Ballman | 169/5 |
| 4,404,982 A | 9/1983 | Ou | |
| 4,436,218 A | 3/1984 | Beese | |
| 4,590,957 A | 5/1986 | McFarlane | |
| 4,591,520 A | 5/1986 | Brodie | |
| 4,597,505 A | 7/1986 | Mozley et al. | |
| 4,750,510 A | * 6/1988 | Short, III | 138/27 X |
| 4,759,460 A | 7/1988 | Mozley | |
| 4,819,683 A | 4/1989 | Buffham et al. | |
| 5,014,731 A | * 5/1991 | Westerberg | 137/59 |
| 5,080,124 A | 1/1992 | McGregor et al. | |
| 5,099,925 A | * 3/1992 | Glidden et al. | 169/17 |
| 5,139,044 A | * 8/1992 | Otten et al. | 137/80 |
| 5,228,469 A | * 7/1993 | Otten et al. | 137/80 |
| 5,467,886 A | 11/1995 | Hinrichs | |
| 5,662,139 A | * 9/1997 | Lish | 137/523 |
| 5,720,351 A | 2/1998 | Beukema et al. | |
| 5,934,329 A | 8/1999 | Perrone | |
| 6,131,599 A | * 10/2000 | DeGood et al. | 137/70 |
| 6,173,767 B1 | * 1/2001 | Kennon | 138/27 X |
| 6,178,983 B1 | 1/2001 | Culliinane et al. | |
| 6,186,169 B1 | * 2/2001 | McHugh | 137/559 |
| 6,263,974 B1 | * 7/2001 | Sundholm | 169/16 X |

* cited by examiner

Primary Examiner—John Rivell
(74) Attorney, Agent, or Firm—Nancy S. Iatarola

(57) ABSTRACT

A kinetic antifreeze device for preventing a dry sprinkler system from freezing is disclosed. The kinetic antifreeze device contains a longitudinal pipe for guiding air and water flow connected to a dry sprinkler system pipe at a junction adjacent to a drain valve. The longitudinal pipe provides a pressure gauge, an isolation valve, a bleed off valve and a relief disc for providing over pressure relief. The relief disc is either a bursting disc device or a rupture disc device which remains closed when the dry sprinkler system is contains only air. The relief disc exits or opens upon fire suppression fluid entering the system after a main supply of fire suppression fluid is actuated by the dry sprinkler system and the pressure increases due to the presence of fire suppression fluid in the dry sprinkler system.

8 Claims, 2 Drawing Sheets

KINETIC ANTIFREEZE DEVICE

BACKGROUND OF THE INVENTION

1. Field of the Invention

This invention relates to dry sprinkler fire suppression systems and particularly to a new use of a bursting disc device or rupture disc device attached to a dry sprinkler system pipe to prevent dry sprinkler systems from freezing and to the new use of a bursting disc device or rupture disc device as an automatic drain for dry sprinkler systems.

2. Description of the Related Art Including Information Disclosed Under 37 CFR 1.97 and 1.98

Dry sprinkler systems utilize piping networks which are typically anhydrous, dry, or free of water until activated by heat from a fire. The main reason for keeping the piping networks dry is to prevent them from freezing when the temperature drops below 0° C. This is in contrast to wet pipe systems wherein the pipes contain water at all times.

Three types of dry sprinkler systems include dry pipe, preaction, and deluge systems. Dry sprinkler system pipes which contain air charged under pressure are sometimes referred to as pipes containing supervisory air. Dry sprinkler system pipes which do not contain supervisory air contain air at atmospheric pressure.

A dry pipe system contains pipes which are charged with air under pressure and when the dry pipe system detects heat from a fire, the sprinkler heads open resulting in a decrease in air pressure. The resultant decrease in air pressure activates the water supply source and allows water to enter the piping system and exit through the sprinkler heads.

A deluge system has pipes that remain free of water, employs sprinkler heads that remain open, and utilizes pneumatic or electrical detectors to detect heat. Deluge systems usually do not contain supervisory air, but do contain air at atmospheric pressure. Once the pneumatic or electrical detectors detect heat, the water supply source provides water to the pipes and sprinkler heads.

A preaction system has pipes that are free of water, employs sprinkler heads that remain closed, has supervisory air, and utilizes pneumatic or electrical detectors to detect heat. Only when dry sprinkler systems detect heat from a fire is water introduced into the otherwise dry network of pipes and sprinkler heads.

A dry sprinkler system that has sprinkler heads which remain open, may not have supervisory air within the network of pipes. Therefore, the air within the network of pipes will not be air charged under pressure, but will be air at atmospheric pressure.

Problems arise when water gets into what should be a dry sprinkler system and the ambient temperature drops below freezing. The dry sprinkler system should have only air under pressure within its pipes or air at atmospheric pressure within its pipes. Pipes and sprinkler heads sometimes become blocked with ice and or debris and render the dry sprinkler system useless. Sometimes this happens when an operator does not shut off the water source. Another occurs when dry sprinkler systems run adjacent to coal carrying conveyor belts as is common in electrical power generating plants. The vibration from conveyor belts or trains moving nearby can open a valve and a water supply.

Another method for unwanted water to get into a dry sprinkler system is when valves or shut off points fail. That failure can be due to mechanical failure or chemical impurities. Salts of magnesium, calcium and iron can prevent valves or shut off points from working properly. Valves and o-rings can disintegrate, which also allows water to enter what should be a dry sprinkler system containing air.

Several methods for preventing sprinkler systems from freezing include the use of antifreeze solution or ethylene glycol, thermal and/or solar wraps to keep the pipes warm, and circulation devices which keep water moving throughout the system. Another device for preventing freezing utilizes a rupturable tab on a wet pipe system and is described in U.S. Pat. No. 5,014,731 to Westerberg. That pressure sensitive rupture tab is activated by the expansion of water due to its inherent physical property to occupy the greatest volume when the temperature drops below 4° C. as the specific volume of water is greatest at 4° C. When water expands at that temperature, water leaves the system and is replaced by a similar volume of warmer water.

Bursting discs have been used for years as a safety device in a system and to allow fluids to escape the system. Bursting discs generally consist of a thin disc with a concave side in touch with the fluid under pressure and a convex side in touch with the atmosphere. The disc is held in place in a housing with at least one tab, hinge, petal, or flange. The tab, hinge, petal, or flange usually remains with the housing after the disc exits the system. However, the tab, hinge, petal, or flange can remain attached to the disc and exit with the disc.

A reverse bursting disc has also been used to relieve excess pressure in a system and operates by placement of the convex side of a disc in touch with the fluid and the convex side in touch with the atmosphere. Petals, hinges, tabs, or flanges are used to position the disc within a housing and keep it in place until over pressure makes the disc exit the housing. The petals, hinges, tabs, or flanges remain either with the housing or they exit with the disc.

Rupture discs are also commonly known. They differ from bursting discs in that the rupture disc is held by a flange and upon activation by a pressure change the rupture disc remains with the housing and tears open.

OBJECTS OF THE INVENTION

A primary object of the present invention is to prevent deluge, preaction, and dry pipe sprinkler systems from freezing by the provision of a bursting disc or a rupture disc on a dry sprinkler system. Another object of the invention is to provide an automatic drain for dry sprinkler systems which is efficient and inexpensive.

SUMMARY OF THE INVENTION

This invention involves the novel use of a bursting disc or a rupture disc on a dry sprinkler system. The bursting disc or rupture disc remains closed or intact when air pressure is that of supervisory air and exits opens when air pressure increases after activation of the dry sprinkler system due to the entrance of water into the preaction, deluge, and dry pipe systems from a main water supply. This invention also involves the novel use of the bursting disc or the rupture disc when air at atmospheric pressure is within the dry sprinkler system. The bursting disc or rupture disc remains closed at atmospheric pressure and opens when water enters the preaction, deluge, and dry pipe systems.

According to a preferred embodiment of the present invention, this invention provides a kinetic antifreeze means for connecting to a dry sprinkler system pipe at a position which is adjacent to a drain valve comprising, in combination: a first longitudinal pipe means and a second longitudinal pipe means for guiding compounds selected from the group consisting of air, water, and fire suppression fluid from the dry sprinkler system pipe to a pressure relief device. The pressure relief device is either a bursting disc device or a rupture disc device. Extending transversely from such dry sprinkler system pipe, such first longitudinal pipe means contains an attachment means for attaching dry sprinkler system components and the attachment means contains pipe threads. Additionally such first longitudinal pipe means has a first end with a first pipe thread, a second end with a second pipe thread, and a bend of about 90° from the first end of the first longitudinal pipe. Such first longitudinal pipe means also contains a port for attachment of a dry sprinkler system part and a pressure gauge means for monitoring pressure in such dry sprinkler system.

The second longitudinal pipe means has a third end with a third pipe thread, a fourth end with a fourth pipe thread, and a fifth end with a fifth pipe thread. Such second longitudinal pipe means also provides a first outlet as the fourth end of the second longitudinal pipe means and a second outlet as the fifth end of the second longitudinal pipe means.

In addition, there between the first longitudinal pipe means and the second longitudinal pipe means is an isolation valve for preventing flow of air, water, and fire suppression fluids or permitting flow of air, water, and fire suppression fluids. The isolation valve is connected to the second end of the first longitudinal pipe means and the third end of the second longitudinal pipe means.

The second longitudinal pipe means has a T-shape. The second longitudinal pipe means also has a test and drain valve means for testing and draining such dry sprinkler system and a relief disc means for providing over-pressure relief for such dry sprinkler system, attached to the first outlet of the T-shaped pipe and the second outlet of the T-shaped pipe, respectively.

Additionally, according to a preferred embodiment of this invention, this invention provides such a kinetic antifreeze means wherein such first longitudinal pipe means comprises: such first pipe thread at such first end of such longitudinal pipe means for assisting connection to an inlet from such dry sprinkler system pipe, such second pipe thread at the second end of the first longitudinal pipe means for connection to the isolation valve means, the bend in the first longitudinal pipe means of about 90° from the first end of the first longitudinal pipe means, and the port for attachment of a pressure gauge means.

Also, it provides such a kinetic antifreeze means wherein such first longitudinal pipe means and such second longitudinal pipe means allow for attachment of the isolation valve means there between such first longitudinal pipe means and such second longitudinal pipe means. In addition such kinetic antifreeze means allows for flow of water, air, or fire suppression fluid in the following direction with respect to a direction from the dry sprinkler system pipe to a first outlet: first longitudinal pipe means, pressure gauge means, isolation valve means in such a position to allow for flow of water, air, or fire suppression fluid, second longitudinal pipe means, and test and drain valve means.

Alternatively, such a kinetic antifreeze means allows for flow of water, air, or fire suppression fluid in the following direction with respect to a direction from the dry sprinkler system pipe to a second outlet: first longitudinal pipe means, pressure gauge means, isolation valve means in such a position to allow for flow of air, water, or fire suppression fluid, second longitudinal pipe means, and bursting disc device.

Additionally, the kinetic antifreeze means allows for attachment of the following dry sprinkler system components to the first longitudinal pipe means in the following order with respect to a direction from such first pipe thread to such second pipe thread: pressure gauge means for measuring pressure within the dry sprinkler system and isolation valve means for allowing flow of air, water, or fire suppression fluid or preventing flow of air, water, or fire suppression fluid. The isolation valve means can be either a ball valve, a gate valve, or a globe valve attached there between such first longitudinal pipe means and such second longitudinal pipe means. The second longitudinal pipe means is connected to the isolation valve means.

Additionally the preferred embodiment provides for connection of the T-shaped pipe to the isolation valve means. The T-shaped pipe contains an inlet, a first outlet and a second outlet. The T-shaped pipe inlet corresponds to the third end of the second longitudinal pipe means, the first outlet corresponds to the fourth end of the second longitudinal pipe means, and the second outlet corresponds to the fifth end of the second longitudinal pipe means.

Such T-shaped pipe inlet is connected to the isolation valve means. The first outlet is connected to a test and drain valve means for testing and draining the dry sprinkler system. The second T-shaped pipe outlet is connected to the relief disc device for over pressure relief of the dry sprinkler system, wherein the relief disc device is either the bursting disc device or the rupture disc device.

Additionally in a preferred embodiment, such first pipe thread of such first longitudinal pipe means extends transversely from such dry sprinkler system pipe at a position on such dry sprinkler system pipe such that the junction of such first longitudinal pipe means is at a position adjacent to a drain valve. The relief disc device is connected to the dry sprinkler system pipe in a region adjacent to the drain valve.

A preferred embodiment of this invention provides a kinetic antifreeze drain means wherein such first longitudinal pipe means has the first end with a first pipe thread and such second end has a second pipe thread. The second longitudinal pipe means has such third end with a third pipe thread, such fourth end has a fourth pipe thread, and such fifth end has a fifth pipe thread.

In addition, the preferred embodiment allows for attachment of the relief disc means for providing over pressure relief of the dry sprinkler system at the fifth pipe thread. The relief disc means may be either the bursting disc or a rupture disc. The relief disc means provides a housing; a housing inlet; a housing outlet; a seat within such housing; a disc; such disc having a flange; such flange provides for sealing engagement in such seat; such that the disc remains within the seat of the housing when the pressure is that of supervisory air pressure within the pipes of the dry sprinkler system. When the disc is a bursting disc, the bursting disc exits the seat of the housing when the pressure increases upon activation of the water supply and entrance of water into the pipes of the dry sprinkler system from a main water supply. Air pressure which is higher than supervisory air pressure will push the bursting disc out of its housing.

In addition, the preferred embodiment allows for attachment of the bursting disc means at the fifth pipe thread; wherein such bursting disc means further provides a housing; the housing inlet; the housing outlet; the seat within such housing; the bursting disc; such bursting disc having a flange; such flange provides for sealing engagement in such seat; such that the bursting disc remains within the seat of the housing when the air pressure within the pipes of the dry sprinkler system is atmospheric pressure; and such that the bursting disc exits the seat of the housing when the pressure increases upon activation of the water supply and entrance of water and fire suppression fluid into the pipes of the dry sprinkler system from a main supply. Water pressure, from a main water supply, would also push the bursting disc out of its housing.

In addition, the preferred embodiment allows for attachment of a rupture disc means at the fifth pipe thread; wherein such rupture disc means further provides such housing; the housing inlet; the housing outlet; the seat within such housing; the rupture disc; such rupture disc having the flange; such flange provides for sealing engagement of such rupture disc in such seat; such that the rupture disc remains closed within the seat of the housing when the pressure is that of supervisory air pressure within the pipes of the dry sprinkler system; and such that the rupture disc opens within the seat of the housing when the pressure increases upon activation of the water supply. Air pressure which is higher than supervisory air pressure would push the rupture disc open.

In addition the preferred embodiment allows for attachment of a rupture disc means at the fifth pipe thread; wherein such rupture disc means further provides a housing; a housing inlet; a housing outlet; a seat within such housing; a rupture disc; such rupture disc having a flange; such flange provides for sealed engagement of such rupture disc in such seat; such that the rupture disc remains closed within the seat of the housing when the pressure is that of atmospheric air pressure within the pipes of the dry sprinkler system; and such that the rupture disc opens within the seat of the housing when the pressure increases upon activation of the water supply. Air pressure or water pressure would push the rupture disc open.

And it further provides for a kinetic antifreeze means wherein the rupture disc device is attached to the fifth end of the second longitudinal pipe. The rupture disc device provides the housing; the housing inlet; the housing outlet; the seat within such housing; and the rupture disc with a flange for sealing engagement in such seat; such that the rupture disc remains closed within the seat of the housing when the supervisory air pressure is 30 psi; and such that the rupture disc opens within the housing when the supervisory air pressure is 100 psi.

And it further provides for a kinetic antifreeze means wherein the bursting disc device is attached to the fifth end of the second longitudinal pipe. The bursting disc device provides the housing; the housing inlet; the housing outlet; the seat within such housing; and the bursting disc with the flange for sealing engagement in such seat; such that the bursting disc remains in sealing engagement within the seat of the housing when the supervisory air pressure is 30 psi; and such that the bursting disc exits the housing when the supervisory air pressure is 100 psi.

The process for producing a kinetic antifreeze device involves the following steps: 1) attaching transversely from a dry sprinkler system pipe and adjacent to a drain valve, a first longitudinal pipe means which contains a first end with a first pipe thread, a second end with a second pipe thread, a bend in the first longitudinal pipe means of about 90° from the first end, and a port for attachment of a pressure gauge, 2) attaching to the port for attachment of a pressure gauge, a pressure gauge, 3) connecting to the first longitudinal pipe means, an isolation valve means for permitting flow of air, water, and fire suppression fluid or preventing flow of air, water, and fire suppression fluid to the second end of the first longitudinal pipe means, 4) connecting a second longitudinal pipe means which contains a third end with a third pipe thread, a fourth end with a fourth pipe thread, and a fifth end with a fifth pipe thread, 3) attaching to the fourth end of the second longitudinal pipe means a test and drain valve means for testing and draining the dry sprinkler system, and 4) attaching to the fifth end of the second longitudinal pipe means a relief disc device comprising a housing, a housing inlet, a housing outlet, a housing seat there between the housing inlet and housing outlet, and a flange for positioning the disc in a sealing engagement within the housing seat such that the disc remains intact within the housing seat at a first pressure and such that the disc exits the housing at a second pressure when the disc is a bursting disc.

That first pressure may be that of supervisory air within the pipes and the second pressure is the increased pressure resulting from compressed air pressure which results upon opening of the main water supply. In addition, that first pressure may be that of atmospheric pressure within the pipes when the second pressure is water pressure.

Another process for producing a kinetic antifreeze device involves the following steps: 1) attaching transversely from a dry sprinkler system pipe and adjacent to a drain valve, a first longitudinal pipe means which contains a first end with a first pipe thread, a second end with a second pipe thread, a bend in the first longitudinal pipe means of about 90° from the first end, and a port for attachment of a pressure gauge, 2) attaching to the port for attachment of a pressure gauge, a pressure gauge, 3) attaching to the second end of the first longitudinal pipe means, an isolation valve means for permitting flow of air, water, and fire suppression fluid or preventing flow of air, water, and fire suppression fluid, 4) attaching to the isolation valve means, a second longitudinal pipe means with a T-shape and such second longitudinal pipe means which contains a third end with a third pipe thread, a fourth end with a fourth pipe thread, and a fifth end with a fifth pipe thread, 3) attaching to the fourth end of the second longitudinal pipe means, a test and drain valve means for testing and draining the dry sprinkler system, and 4) attaching to the fifth end of the second longitudinal pipe means a relief disc device comprising a housing, a housing inlet, a housing outlet, a housing seat there between the housing inlet and housing outlet, and a flange for positioning the disc in a sealing engagement within the housing seat such that the disc remains closed within the housing seat at a first pressure and such that the disc opens the housing at a second pressure when the disc is a rupture disc.

The first pressure may be that of supervisory air within the pipes and the second pressure is the increased pressure resulting from compressed air pressure which results upon opening of the main water supply. In addition, that first pressure may that of atmospheric pressure within the pipes and such that the second pressure is water pressure.

Figure 1:
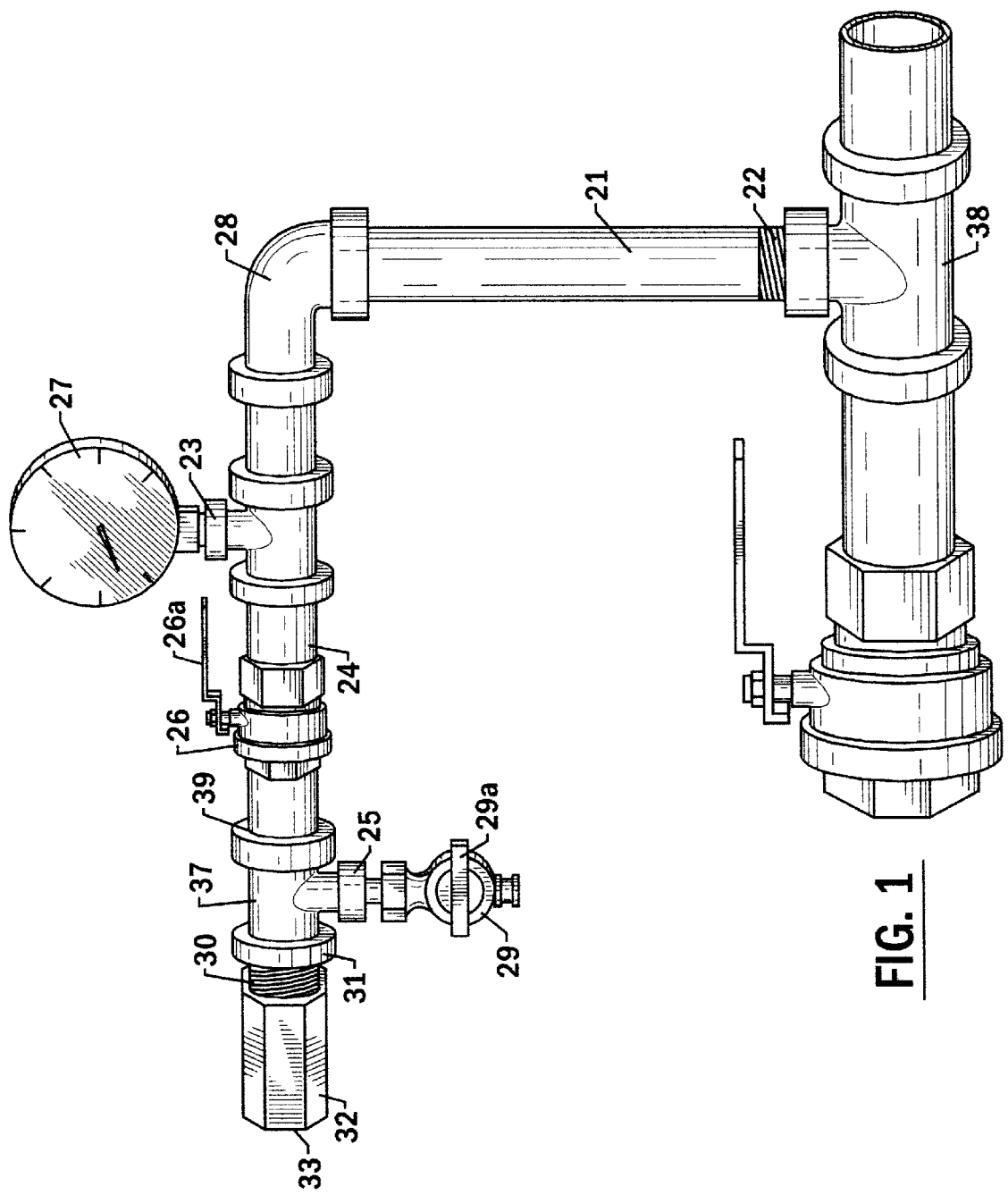
FIG. 1 is a perspective view of the preferred embodiment of the present invention connected to a dry sprinkler system.

21 embodies the first longitudinal pipe
22 embodies the first end of the first longitudinal pipe
23 embodies the port or orifice within the first longitudinal pipe
24 embodies the second end of the first longitudinal pipe
25 embodies the fourth end or first outlet of the second longitudinal pipe 26 embodies the isolation valve 27 embodies the pressure gauge 28 embodies the bend of about 90 degrees from the first end of the first longitudinal pipe 29 embodies the test and drain valve 29a embodies the test and drain valve handle 30 embodies the male pipe threads and the first end of the bursting disc device housing 31 embodies the fifth end or the second outlet of the second longitudinal pipe 32 embodies the housing of the bursting disc device 33 embodies the housing outlet 34 embodies the disc 35 embodies the flange surrounding the bursting disc which holds the bursting disc within the seat 36 embodies the seat within the housing 37 embodies the second longitudinal pipe which has a T-shape 38 embodies the position on the dry sprinkler system pipe adjacent to a main drain valve 39 embodies the third end of the second longitudinal pipe which provides for attachment to the isolation valve

DETAILED DESCRIPTION OF A PREFERRED EMBODIMENT AND THE BEST MODE OF PRACTICE

With particular reference to FIG. 1, is a first longitudinal pipe 21 which is attached to a position on a dry sprinkler system pipe 38 that is adjacent to a drain valve. The dry sprinkler system could be a preaction, deluge, or dry pipe sprinkler system. These three dry sprinkler system pipes may contain supervisory air which is air charged under pressure. These three dry sprinkler system pipes may also contain air at atmospheric pressure.

The first longitudinal pipe 21 has a first pipe thread 22 at the point at which the invention meets the dry sprinkler system pipe 38. The first longitudinal pipe 21 has a port 23 for attachment of a pressure gauge 27. An isolation valve 26 which is a ball valve with a valve handle 26a is connected to the second end 24 of the first longitudinal pipe. The position of the ball valve handle 26a shows that when the ball valve handle 26a is parallel with the second end 24, that the valve is open and allows flow of air, water, and fire suppression fluid. When the ball valve handle 26a is perpendicular to the second end 24, the valve is closed and prevents flow of air, water, and fire suppression fluid.

A second longitudinal pipe 37 is connected to the isolation valve 26. The second longitudinal pipe 37 has a third end 39, a fourth end 25, and a fifth end 31. The second longitudinal pipe is a T-shaped pipe with the third end 39 as the inlet for the T-shaped pipe, the fourth end 25 as a first outlet for connection to a bleed-off valve 29, and the fifth end 31 as a second outlet for connection to a bursting disc device wherein the housing 32 has a housing inlet 31 and a housing outlet 32 with a seat 36 there between the housing inlet 31 and the housing outlet 33. The disc 34 is either a bursting disc or a rupture disc. The disc 34 has a flange 35 around it, so it will remain in the seat 36 when the supervisory air pressure is what it should be in a dry sprinkler system in good working condition. For example the supervisory air pressure within a dry sprinkler system may be about 30 psi. When the supervisory air pressure is about 30 psi the bursting disc 34 should remain in sealing engagement with the seat 36. However, when the supervisory air pressure increases after water enters the dry sprinkler system the air will become compressed and as a result the pressure will go up. After water enters the dry sprinkler system making the air pressure increase, then when the disc 34 is a bursting disc 34, the disc 34 will exit the housing 32 and allow air to flow out of the system making a path for the water and or fire suppression fluid to exit. For example a preaction dry sprinkler system that is adjacent to a coal carry conveyor belt near a steel mill or a utility company like an electrical power plant may have a supervisory air pressure of 30 psi in its dormant but operational state but may have an air pressure of 100 psi upon opening the main water supply. When the main water supply opens it allows water to enter the system and as a result of water entering the system, the air becomes compressed and the pressure increases. At that point the bursting disc 34 will exit the system and allow the air, water, or fire suppression fluid to leave the system.

FIG. 1 illustrates the ports of attachment on the first longitudinal pipe including the first end 22, a port for attachment of a pressure gauge 23, and a second end for attachment of an isolation valve 26.

The bursting disc housing inlet 30 is attached to the fifth end 31 of the second longitudinal pipe 37. A T-shaped pipe may be used as the second longitudinal pipe 37 and connect to both a bursting disc device 32 at a second outlet 31 and a bleed off valve 29 at a first outlet 25, and to an isolation valve 26. The isolation valve 26 is connected to the second end 24 of the first longitudinal pipe 21. The first longitudinal pipe 21 which contains a pressure gauge 27 has a bend 28 in the first longitudinal pipe 21 of about 90° from the first end 22 of the first longitudinal pipe 21. The longitudinal pipe 21 should extend transversely from a dry sprinkler system pipe at a position 38 adjacent to a main drain valve for the bursting disc device to work as a kinetic antifreeze device and an automatic drain.

Figure 2:
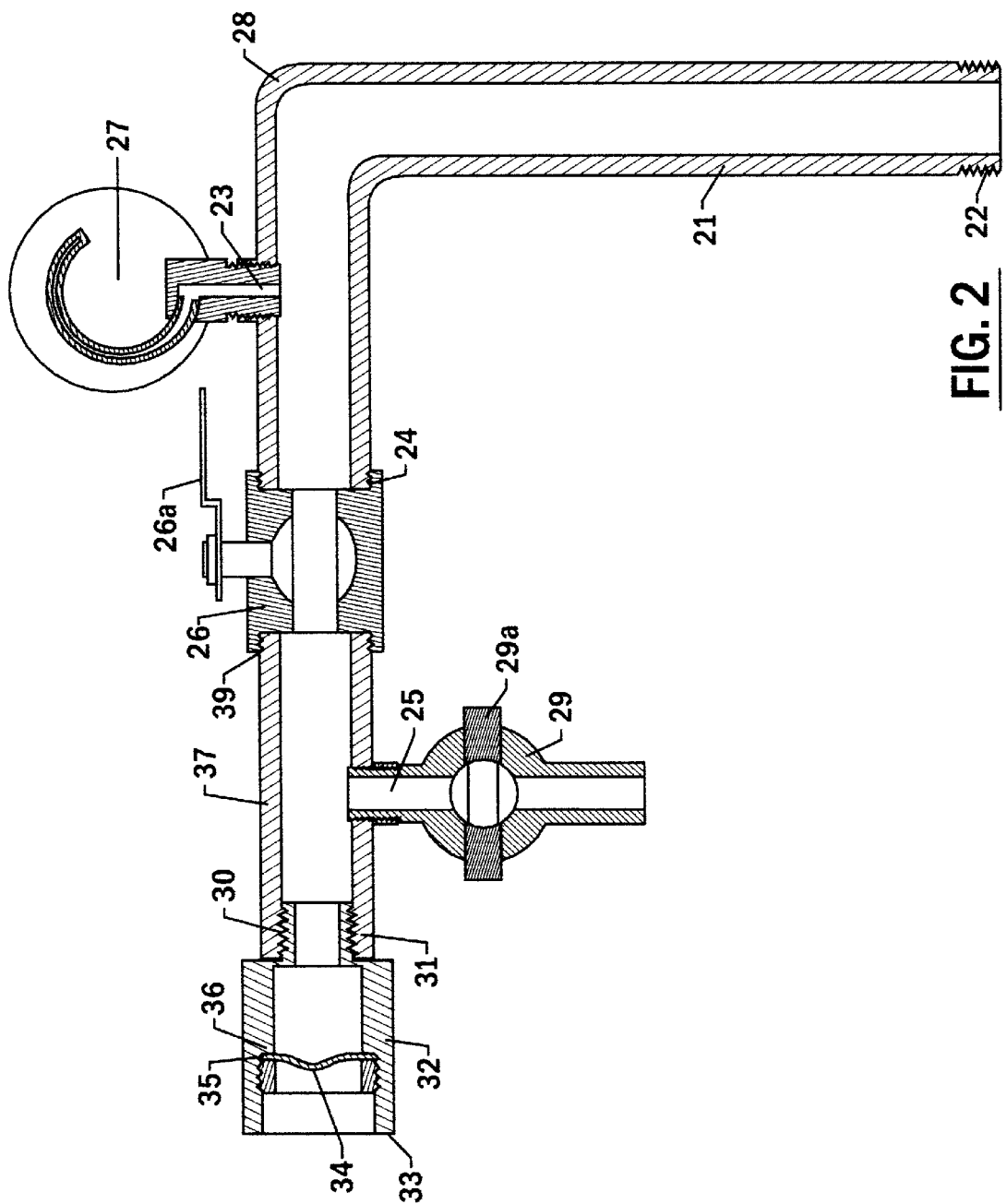
FIG. 2 is a cross-sectional view of the preferred embodiment of the present invention.

FIG. 2 is a cross-sectional view of the preferred embodiment of the present invention. The first longitudinal pipe 21 contains a first end 22 with a first pipe thread, a bend 28 of about 90° from the first end 22 of the first longitudinal pipe 21, a port 23 for attachment of a pressure gauge 27, and a second end 24 with a second pipe thread. The ball valve 26 with a ball valve handle 26a, is shown in a position which permits flow of air, water, and fire suppression fluid as the ball valve handle 26a is parallel with the ball valve 26. The ball valve 26 is connected to a second longitudinal pipe 37. The second longitudinal pipe 37 is T-shaped and has a third end 39 with a third pipe thread and is the inlet for the second longitudinal pipe 37. The second longitudinal pipe 37 is T-shaped and is connected to the ball valve 26 at the third end 39 of the second longitudinal pipe 37. The second longitudinal pipe 37 has a fourth end 25 with a fourth pipe thread which is actually a first outlet of the kinetic antifreeze device. The fifth end 31 with a fifth pipe thread is the second outlet of the kinetic antifreeze device. A bleed off valve 26 is attached to the fourth end 25 or first outlet of the kinetic antifreeze device. The bleed off valve handle 29a is shown in the closed position because it is perpendicular to the bleed off valve 29.

FIG. 2 illustrates a bursting disc device with a housing 32, a housing inlet 31 with male pipe threads 30, a housing outlet 33, a seat 36, a flange 35, and a bursting disc 34. The bursting disc 34 is shown in sealing engagement with the seat 36 as the flange 35 is holding it within the seat 36. The bursting disc 34 is held within the seat 35 if only air at atmospheric pressure or supervisory air is within the dry sprinkler system. When the dry sprinkler system is activated due to heat from a fire, water will enter the dry sprinkler system. The presence of water within the system will compress the supervisory air and a resultant increase in pressure will exist within the system. That increased pressure within the dry sprinkler system will make the bursting disc 34 exit the housing 32 and allow air, water, and fire suppression fluid to exit through the housing outlet 33.

If, however, the dry sprinkler system contains air at atmospheric pressure within its network of pipes, the water pressure within the sprinkler system will make the bursting disc 34 exit the housing 32 and allow air, water, and fire suppression fluid to exit through the housing outlet 33.

A good length of the first longitudinal pipe means and the second longitudinal pipe means is about 20 inches long. The port for the pressure gauge is about eight inches from the first end of the first longitudinal pipe means and has internal pipe threads sized one-quarter inch N.P.T.

The port for the isolation valve has a center about 13 inches from the first end of the first longitudinal pipe and a valve handle for actuating the isolation valve.

The port for the relief disc means has a center about 20 inches from the first end of the longitudinal pipe means and internal pipe threads sized one-half inch N.P.T. The test and drain valve is about 18 inches from the first end of the longitudinal pipe.

DETAILED DESCRIPTION OF THE INVENTION

Shown in FIG. 1 is a perspective view of a preferred embodiment of the kinetic antifreeze device of the present invention connected to a dry sprinkler system; and FIG. 2 is a cross-sectional view of the kinetic antifreeze device. With particular reference to FIG. 1 is the first longitudinal pipe 21 for delivery of water, air, and fire suppression fluid from a position 38 on a dry sprinkler pipe which is adjacent to a main drain. The first longitudinal pipe 21 has a bend 28 of about 90 degrees from the first end 22 of the first longitudinal pipe 21 in order to allow the air, water, and fire suppression fluid to travel through the longitudinal pipe to either a test and drain valve means 29 for testing and draining the sprinkler system or a relief disc device 34 for providing over pressure relief of the sprinkler system. The relief disc device 34 may be either a rupture disc device or a bursting disc device.

The first longitudinal pipe 21 has an orifice 23 or port 23 for attachment of a pressure gauge 27. The pressure within the system is what triggers the kinetic antifreeze device. Within most dry sprinkler systems such as preaction, deluge, and dry pipe sprinkler systems, air is charged under pressure. The air is called supervisory air. For a dry sprinkler system to work properly, only air should be within the network of pipes and sprinkler heads when the sprinkler system is in a working but dormant state. The sprinkler system contains only air, because if water gets into the sprinkler system and the temperature drops below freezing, ice will block the network of pipes and render the dry sprinkler system inoperable.

When supervisory air is within the dry sprinkler system the pressure will be low or at a first pressure which illustrates the presence of only supervisory air. For example, a preaction system may contain only 30 psi of supervisory air. Then, when the dry sprinkler system detector detects heat, water enters the system from a main water supply. The presence of water in the sprinkler system network of pipes compresses the air and causes an increase in pressure within the system. That is when the bursting disc 34 exits the system and allows air, water, and fire suppression fluid to exit the system.

Alternatively a rupture disc device would rupture, tear, or open and allow air, water, and fire suppression fluid to exit the system.

The invention includes an isolation valve 26 in order to permit flow of air, water, and fire suppression fluid or prevent flow of air, water, and fire suppression fluid. The isolation valve is connected to the second end 24 of the first longitudinal pipe 21.

With particular reference to FIG. 1, the second longitudinal pipe 37 is a T-shaped pipe. FIG. 1 illustrates how the T-shaped pipe 37 is connected to the isolation valve 26. The T-shaped pipe has two outlets, the first outlet 25 for a bleed off valve 29 and the second outlet 31 for the bursting disc device 34 with a bursting disc 34. A rupture disc device could be substituted for the bursting disc device 34.

The kinetic antifreeze device has a length of about 20 inches long. The port for the pressure gauge has a center about eight inches from the first end of the first longitudinal pipe and internal pipe threads sized one-quarter inch N.P.T. The port for the isolation valve has a center about 13 inches from the first end of the first longitudinal pipe and a valve handle for actuating the isolation valve. The port for the relief disc has a center about 20 inches from the first end of the first longitudinal pipe means and internal pipe threads sized one-half inch N.P.T. The test and drain valve is about 18 inches from said the end of the first longitudinal pipe.

What is claimed is:

1. A kinetic antifreeze device for a dry sprinkler system comprising:
   a. extending transversely from a dry sprinkler system pipe;
   b. at a junction on said dry sprinkler system pipe adjacent to a main drain valve;
   c. a first longitudinal pipe means for guiding compounds selected from the group consisting of air, water, and fire suppression fluid from said dry sprinkler system pipe to an outlet;
   d. said outlet comprising a relief disc means for providing system over-pressure relief;
   e. extending from said first longitudinal pipe means, multiple attachment means for attaching components selected from the group consisting of
      i) pressure gauge means for monitoring pressure within said dry sprinkler system;
      ii) isolation valve means for permitting flow of said compounds selected from the group consisting of air, water, and fire suppression fluid or preventing flow of said compounds selected from the group consisting of air, water, and fire suppression fluids;
      iii) test and drain valve means for testing and draining said dry sprinkler system; and
      iv) said relief disc means; and
   f. wherein said multiple attachment means comprise pipe threads.

2. A kinetic antifreeze device for a dry sprinkler system, comprising:
   a. extending transversely from a dry sprinkler system pipe, a first longitudinal pipe means for guiding compounds selected from the group consisting of air, water, and fire suppression fluid, wherein said first longitudinal pipe means extends transversely from a position on said dry sprinkler system pipe adjacent to a main drain valve, said first longitudinal pipe means further comprising:
      i. a first pipe thread at a first end of said longitudinal pipe means for assisting connection to to said dry sprinkler system pipe;

ii. a port for attachment of a dry sprinkler system component;
iii. a second pipe thread at a second end of said longitudinal pipe means;
iv. a pressure gauge connected to said port for attachment of a dry sprinkler system component;
v. a bend in said longitudinal pipe of about 90 degrees from said first end of said longitudinal pipe;
b. isolation valve means for permitting flow of compounds selected from the group consisting of air, water, and fire suppression fluid or preventing flow of said compounds selected from the group consisting of air, water, and suppression fluid;
  i. said isolation valve means connected to said second end of said first longitudinal pipe means;
c. a second longitudinal pipe means, further comprising:
  i. a third end with a third pipe thread for connection to said isolation valve means;
  ii. a fourth end with a fourth pipe thread, said fourth end further comprising a first outlet of said second longitudinal pipe means;
  iii. a fifth end with a fifth pipe thread, said fifth end further comprising a second outlet of said second longitudinal pipe means;
  iv. a T-shape;
d. a test and drain valve means for testing and draining said sprinkler system; said test and drain valve means attached to said fourth end of said second longitudinal pipe means; and
e. connected to said fifth end of said longitudinal pipe means, a relief disc means for providing over pressure relief, said relief disc means selected from the group consisting of a bursting disc device and a rupture disc device.

3. A kinetic antifreeze device according to claim 2, further comprising:
  a. a length of said first longitudinal pipe means and said second longitudinal pipe means of about 20 inches long;
  b. said port for said pressure gauge means comprises
    i. a center about eight inches from said first end of said first longitudinal pipe means; and
    ii. internal pipe threads sized one-quarter inch N.P.T.;
  c. said port for said isolation valve means comprises
    i. a center about 13 inches from said first end of said first longitudinal pipe means; and
    ii. a valve handle for actuating said isolation valve means;
  d. said port for said relief disc means comprises
    i. a center about 20 inches from said first end of said first longitudinal pipe means; and
    ii. internal pipe threads sized one-half inch N.P.T.; and
  e. said test and drain valve means is about 18 inches from said first end of said first longitudinal pipe means.

4. A kinetic antifreeze device for a dry sprinkler system according to claim 2, wherein said relief disc means further comprises
  a. a housing,
  b. a housing inlet,
  c. a housing outlet,
  d. a seat there between said housing inlet and said housing outlet
  e. said housing inlet further comprising pipe threads for sealing attachment to said fifth end of said longitudinal pipe means;
  f. a disc selected from the group consisting of a bursting disc and a rupture disc there between said housing inlet and said housing outlet;
  g. a flange surrounding said disc for sealing engagement of said disc with said seat;
  h. said disc preventing exit of said compounds selected from the group consisting of air, water, and fire suppression fluid when said pressure is at a first pressure; said disc allowing exit of compounds selected from the group consisting of air, water, and fire suppression fluid when said pressure is at a second pressure.

5. A kinetic antifreeze device for a dry sprinkler system according to claim 2, wherein said relief disc means comprises
  a. a housing;
  b. a housing inlet;
  c. a housing outlet;
  d. a seat there between said housing inlet and said housing outlet
  e. said housing inlet for sealing engagement to said fifth end of said second longitudinal pipe means;
  f. a disc selected from the group consisting of a bursting disc and a rupture disc there between said housing inlet and said housing outlet;
  g. said disc remaining closed or in sealing engagement with said seat when said pressure is that of supervisory air within said dry sprinkler system; and said disc allowing exit of compounds selected from the group consisting of air, water, and fire suppression fluid when said pressure is increased pressure when fire suppression fluid enters said dry sprinkler system from opening of a main supply of fire suppression fluid.

6. A kinetic antifreeze device for a dry sprinkler system according to claim 2, wherein said relief disc means comprises
  a. a housing,
  b. a housing inlet,
  c. a housing outlet,
  d. a seat there between said housing inlet and said housing outlet
  e. said housing inlet further comprising pipe threads for sealing attachment to said second end of said longitudinal pipe means;
  f. a disc selected from the group consisting of a bursting disc and a rupture disc there between said housing inlet and said housing inlet,
  g. said disc further comprising a flange; said flange for sealing engagement of said disc;
  h. said disc remaining closed or preventing exit of said fire suppression fluid when said pressure is atmospheric pressure, said relief disc allowing exit of said fire suppression fluid when pressure increases upon opening of a main supply of fire suppression fluid.

7. A process for preventing a dry sprinkler system from freezing comprising the steps of:
  a. positioning transversely on said dry sprinkler system pipe, at a position on said dry sprinkler pipe which is adjacent to a main drain valve, a first longitudinal pipe means for guiding compounds selected from the group consisting of air, water, and fire suppression fluid;
  b. positioning on said first longitudinal pipe means, a pressure gauge;
  c. connecting to said first longitudinal pipe means, an isolation valve;

d. connecting to said isolation valve, a T-shaped second longitudinal pipe, said T-shaped second longitudinal pipe having a first outlet and a second outlet;

d. connecting to said first outlet of said T-shaped second longitudinal pipe; a relief disc device selected from the group consisting of a bursting disc device and a rupture disc device;

e. connecting to said second outlet of said T-shaped second longitudinal pipe, a test and drain valve means for testing and draining said dry sprinkler system.

8. A process for preventing a dry sprinkler system from freezing comprising the steps of:

a. connecting to a dry sprinkler system pipe at a junction on said dry sprinkler system pipe which is adjacent to a main drain valve, a first longitudinal pipe means for guiding compounds selected from the group consisting of air, water, and fire suppression fluid;

b. attaching to said first longitudinal pipe means, a pressure gauge;

c. connecting to said first longitudinal pipe means, an isolation valve for permitting flow of air, water, and fire suppression fluid or preventing flow of air, water, and fire suppression fluid, d. connecting to said isolation valve means, a T-shaped pipe with an inlet for connection to said isolation valve menas, first outlet, and a second outlet;

e. attaching to said first outlet of said T-shaped pipe, a test and drain valve means for testing and draining said dry sprinkler system;

f. attaching to said second outlet T-shaped pipe a relief disc device selected from the group consisting of a bursting disc device and a rupture disc device; and g. releasing air and fire suppression fluid through the relief disc device when fire suppression fluid from a main fire suppression fluid supply enters the dry sprinkler system and the resultant pressure within said dry sprinkler system increases.

\* \* \* \* \*